(12) United States Patent
Kawaguchi et al.

(10) Patent No.: US 7,026,416 B2
(45) Date of Patent: Apr. 11, 2006

(54) FLUOROPOLYMER

(75) Inventors: Yasuhide Kawaguchi, Yokohama (JP); Shinji Okada, Yokohama (JP); Yoko Takebe, Yokohama (JP); Osamu Yokokoji, Yokohama (JP); Isamu Kaneko, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/124,133

(22) Filed: May 9, 2005

(65) Prior Publication Data

US 2005/0209409 A1    Sep. 22, 2005

Related U.S. Application Data

(63) Continuation of application No. PCT/JP03/14159, filed on Nov. 6, 2003.

(30) Foreign Application Priority Data

Nov. 7, 2002    (JP) .............................. 2002-323826

(51) Int. Cl.
*C08F 136/16*    (2006.01)
*C08F 236/16*    (2006.01)
*C08F 36/16*    (2006.01)
*G03F 7/039*    (2006.01)

(52) U.S. Cl. ....................... 526/252; 526/321; 526/247; 430/270.1

(58) Field of Classification Search ................ 526/252, 526/321
See application file for complete search history.

(56) References Cited

U.S. PATENT DOCUMENTS

| 5,589,557 | A | * | 12/1996 | Navarrini et al. ............ 526/247 |
| 5,830,966 | A | * | 11/1998 | Thang et al. ................ 526/321 |
| 6,468,712 | B1 | * | 10/2002 | Fedynyshyn ............. 430/270.1 |
| 6,733,952 | B1 | | 5/2004 | Kaneko et al. |
| 6,737,215 | B1 | * | 5/2004 | Dammel et al. ......... 430/270.1 |
| 6,815,146 | B1 | | 11/2004 | Okada et al. |
| 6,818,258 | B1 | | 11/2004 | Kaneko et al. |
| 6,858,692 | B1 | | 2/2005 | Kaneko et al. |
| 2003/0148213 | A1 | | 8/2003 | Kaneko et al. |

FOREIGN PATENT DOCUMENTS

| JP | WO 02-065212 A1 * | 8/2002 |
| WO | WO 00/17712 | 3/2000 |
| WO | WO 00/67072 | 11/2000 |
| WO | WO 01/63362 | 8/2001 |
| WO | WO 02/64648 | 8/2002 |

* cited by examiner

*Primary Examiner*—David W. Wu
*Assistant Examiner*—Ives Wu
(74) *Attorney, Agent, or Firm*—Oblon, Spivak, McClelland, Maier & Neustadt, P.C.

(57) ABSTRACT

To provide a fluoropolymer suitable for use as a base polymer for resist materials for excimer lasers having a wavelength of 250 nm or shorter.

A fluoropolymer having a monomer unit formed by cyclopolymerization of a fluorinated diene compound represented by the following formula (3), $$CF_2=CFCF_2-C(CF_3)(R^5)-CH_2CH=CH_2 \quad (3)$$

wherein $R^5$ is either a hydroxyl group blocked by $-CHR^7-O-R^8$ or an organic group having the hydroxyl group, and $R^8$ is a cyclic saturated hydrocarbon such as a cycloalkyl group which may have a substituent, or an organic group having the cyclic saturated hydrocarbon.

4 Claims, No Drawings

FLUOROPOLYMER

CROSS-REFERENCE TO A RELATED APPLICATION

The present application is a continuation of International Application PCT/JP03/14159, filed Nov. 6, 2003, which claims priority to Japanese Patent Application No. 2002-323826 filed Nov. 7, 2002.

TECHNICAL FIELD

The present invention relates to a novel fluoropolymer.

BACKGROUND ART

In recent years, along with the progress in fine circuit patterns in the process for producing semiconductor integrated circuits, a photoresist material having high resolution and high sensitivity is demanded. As the circuit patterns become fine, a short wavelength of a light source for an exposure apparatus becomes essential. In an application as a base polymer for a resist material to lithography employing an excimer laser of 250 nm or shorter, a polyvinyl phenol type resin, an alicyclic acrylic type resin, a polynorbornene type resin (e.g., description of WO01/63362 or the like), a fluorinated resin (e.g., description of WO00/17712 or the like) or the like has, for example, been proposed, but satisfactory resolution, sensitivity and high dry etching resistance have not been obtained.

It is an object of the present invention to provide a base polymer for a resist material having excellent properties, particularly excellent dry etching resistance.

DISCLOSURE OF THE INVENTION

The present invention relates to a fluoropolymer characterized by having a monomer unit formed by cyclopolymerization of a fluorinated diene represented by the formula (1):

$$CF_2=CR^1—R^3—C(R^4)(R^5)—R^6—CR^2=CH_2 \quad (1)$$

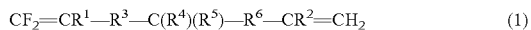

(wherein each of $R^1$ and $R^2$ which are independent from each other, is a hydrogen atom, a fluorine atom, an alkyl group having a carbon number of at most 3, or a fluoroalkyl group having a carbon number of at most 3; each of $R^3$ and $R^6$ which are independent from each other, is a single bond, an oxygen atom, an alkylene group having a carbon number of at most 3, which may have an etheric oxygen atom, or a fluoroalkylene group having a carbon number of at most 3, which may have an etheric oxygen atom; $R^4$ is a hydrogen atom, a fluorine atom, an alkyl group having a carbon number of at most 3, or a fluoroalkyl group having a carbon number of at most 3, which may have an etheric oxygen atom; and $R^5$ is a hydroxyl group blocked by a blocking group represented by the formula (2) or an organic group having a hydroxyl group blocked by the blocking group represented by the formula (2)):

$$—CHR^7—O—R^8 \quad (2)$$

(wherein $R^7$ is a hydrogen atom or an alkyl group having a carbon number of at most 3, and $R^8$ is a cycloalkyl group which may have a substituent, an organic group having at least one of said cycloalkyl group, a bicycloalkyl group which may have a substituent, or an organic group having at least one of said bicycloalkyl group).

BEST MODE FOR CARRYING OUT THE INVENTION

The present invention relates to a fluoropolymer having a monomer unit formed by cyclopolymerization of a fluorinated diene (hereinafter referred to as fluorinated diene (1)) represented by the following formula (1).

$$CF_2=CR^1—R^3—C(R^4)(R^5)—R^6—CR^2=CH_2 \quad (1)$$

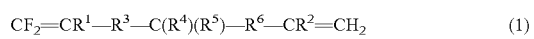

In the above formula, each of $R^1$ and $R^2$ which are independent from each other, is a hydrogen atom, a fluorine atom, an alkyl group having a carbon number of at most 3, or a fluoroalkyl group having a carbon number of at most 3. However $R^1$ is preferably a fluorine atom or a trifluoromethyl group, particularly preferably a fluorine atom. $R^2$ is preferably a hydrogen atom or a methyl group, particularly preferably a hydrogen atom. Further, it is most preferred that $R^1$ is a fluorine atom, and $R^2$ is a hydrogen atom.

Each of $R^3$ and $R^6$ which are independent from each other, is a single bond, an oxygen atom, an alkylene group having a carbon number of at most 3, which may have an etheric oxygen atom, or a fluoroalkylene group having a carbon number of at most 3, which may have an etheric oxygen atom. $R^3$ is particularly preferably a difluoromethylene group. $R^6$ is particularly preferably a methylene group. $R^4$ is a hydrogen atom, a fluorine atom, an alkyl group having a carbon number of at most 3, or a fluoroalkyl group having a carbon number of at most 3, which may have an etheric oxygen atom. $R^4$ is particularly preferably a fluorine atom or a trifluoromethyl group.

$R^5$ in the formula (1) is a hydroxyl group blocked by a blocking group represented by the formula (2) or an organic group having a hydroxyl group blocked by the blocking group represented by the formula (2). Particularly, it is preferred that a hydroxy group blocked by the blocking group represented by the formula (2). "Blocked" means that a hydrogen atom on a hydroxyl group is substituted by a blocking group. The blocking group of the present invention is characterized in that it is easily detached by an acid, and it is not easily detached by an alkali.

$$—CHR^7—O—R^8 \quad (2)$$

$R^7$ is a hydrogen atom or an alkyl group having a carbon number of at most 3, but it is particularly preferably a hydrogen atom or a methyl group. Further, in a case of employing as a chemical amplification type resist which is useful for fine processing employing vacuum ultraviolet rays such as $F_2$ excimer laser, $R^8$ is a cycloalkyl group which may have a substituent, an organic group having at least one of said cycloalkyl group, a bicycloalkyl group which may have a substituent, or an organic group having at least one of said bicycloalkyl group, since having an appropriate transparency and an excellent dry etching resistance.

As a cycloalkyl group, a $C_{5-8}$ cycloalkyl group is preferred, and a cyclohexyl group is particularly preferred. As a bicycloalkyl group, a $C_{7-12}$ bicycloalkyl group is preferred, and a bicycloheptyl group such as a bicyclo[2,2,1]heptyl group (a norbornyl group) or the like, a bicyclooctyl group, a bicyclodecyl group or the like, may, for example, be mentioned. Particularly, a norbornyl group is preferred. As the above-mentioned organic group, a $C_{1-3}$ alkyl group is preferred.

As previously mentioned, an organic group having a blocked hydroxyl group is preferably an organic group having an acidic hydroxyl group. The acidic hydroxyl group is a hydroxyl group indicating an acidity, such as a hydroxyl group directly bonded to a ring of an aryl group (phenolic hydroxyl group), a hydroxyl group bonded to a carbon atom having a perfluoroalkyl group bonded thereto, a hydroxyl group bonded to a tertiary carbon atom, or the like. Particularly, a hydroxyl group bonded to a carbon atom having one or two perfluoroalkyl groups bonded thereto, is preferred. As a perfluoroalkyl group, a $C_{1-2}$ perfluoroalkyl group is preferred. If the perfluoroalkyl group is a trifluoromethyl group, a hydroxyl group in a bivalent group represented by the following formula (d-1) (i.e., a hydroxyl group of a hydroxytrifluoromethylmethylene group), or a hydroxyl group in a monovalent group represented by the following formula (d-2) or (d-3) (i.e., a 1-hydroxy-1-trifluoromethyl-2,2,2-trifluoroethyl group or a hydroxyl group of a 1-hydroxy-1-methyl-2,2,2-trifluoroethyl group) is preferred.

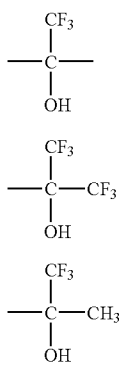

When Q is represented by $R^3$—$C(R^4)(R^5)$—$R^6$ of the fluorinated diene (1), it is considered that by cyclopolymerization of the fluorinated diene (1), the following monomer units (a) to (c) will be formed. From the results of the spectroscopic analysis, etc, a cyclized polymer of the fluorinated diene (1) is considered to be a polymer having a structure containing at least one monomer unit selected from monomer unit (a), monomer unit (b) and monomer unit (c).

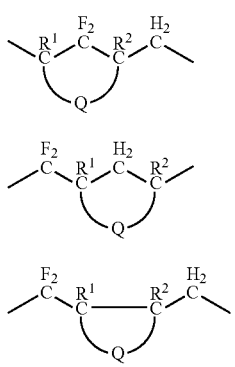

The fluoropolymer of the present invention is preferred that $R^1$ of the formula (1) is a fluorine atom; $R^2$ is a hydrogen atom; $R^3$ is a difluoromethylene group; $R^4$ is a trifluoromethyl group; and $R^6$ is a methylene group. Namely, it is preferred to have monomer units formed by cyclopolymerization of a fluorinated diene having a structure represented by the formula (3) (hereinafter referred to as fluorinated diene (3)).

$$CF_2=CFCF_2-C(CF_3)(R^5)-CH_2CH=CH_2 \quad (3)$$

Additionally, in the blocking group represented by the formula (2), it is preferred that $R^8$ is a structure represented by the formula (4), (5) or (6). Particularly, it is most preferred that the fluorinated diene (3) is a fluoropolymer having monomer units formed by cyclopolymerization; $R^5$ is —O—$CH_2$—$R^8$; and $R^8$ is a structure represented by the formula (4), (5) or (6).

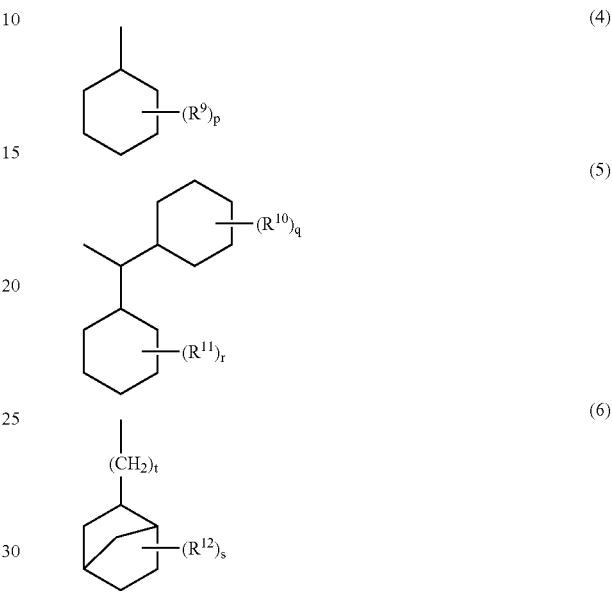

In the above formulae, each of $R^9$, $R^{10}$, $R^{11}$ and $R^{12}$ which are independent from each other, is a fluorine atom, an alkyl group having a carbon number of at most 3, a tert-butyl group, a cyclohexyl group, a cyclopentyl group, or a fluoroalkyl group having a carbon number of at most 3, and each of p, q, r and s which are independent from each other, is an integer of from 0 to 11, and t is 0 or 1. When p is at least 2, each $R^9$ may be different. When q is at least 2, each $R^{10}$ may be different. When r is at least 2, each $R^{11}$ may be different. When s is at least 2, each $R^{12}$ may be different.

Additionally, in the formula (4), $R^9$ is a $C_{1-3}$ alkyl group, a tert-butyl group or a cyclohexyl group, and it is particularly preferred that p is an integer of from 1 to 3. In the formula (5), it is particularly preferred that q and r are both 0; q is an integer of from 1 to 3; $R^{10}$ is a $C_{1-3}$ alkyl group; r is an integer of from 1 to 3; and $R^{11}$ is a $C_{1-3}$ alkyl group. In the formula (6), it is particularly preferred that s is 0; or s is an integer of from 1 to 3 and $R^{12}$ is a $C_{1-3}$ alkyl group.

The fluoropolymer of the present invention preferably has monomer units other than monomer units formed by cyclopolymerization of the fluorinated diene (1) (hereinafter referred to as monomer units (1)). Particularly, as other monomer units, $R^5$ in the formula (1) preferably has a hydroxyl group which is not blocked, or monomer units (hereinafter referred to as hydroxyl group-containing monomer units) formed by cyclopolymerization of a fluorinated diene (hereinafter referred to as hydroxyl group-containing fluorinated diene) which is an organic group having a non-blocked hydroxyl group.

A solubility of resist materials can be controlled by controlling a ratio of monomer units (1) and hydroxyl group-containing monomer units in the fluoropolymer of the present invention. In such a case, a blocked ratio in the fluoropolymer (a ratio of monomer units (1) to the total of the monomer units (1) and hydroxyl group-containing monomer units) is preferably from 5 to 99 mol %, particularly preferably from 10 to 90 mol %.

Further, the fluoropolymer of the present invention may have a monomer unit formed by cyclopolymerization (hereinafter referred to as "other block-containing monomer unit") of a fluorinated diene (hereinafter referred to as "other fluorinated diene") wherein $R^5$ in the fluorinated diene represented by the formula (1), is a hydroxyl group blocked by a blocking group (hereinafter referred to as "other blocking group") other than the blocking group represented by the formula (2) or an organic group having a hydroxyl group blocked by other blocking group. In such a case, a ratio of monomer units (1) to the total of monomer units (1) and other block-containing monomer units is preferably from 5 to 90 mol %. A monomer unit (1), a hydroxyl group-containing monomer unit and other block-containing monomer unit may exist together.

The fluoropolymer of the present invention may contain a monomer unit (hereinafter referred to as "other monomer unit") derived from other radical polymerizable monomer units within a range not to impair its characteristics. The ratio of other monomer units is preferably at most 30 mol %, particularly preferably at most 15 mol %.

Examples of other monomer units include monomer units derived from α-olefines such as ethylene, propylene or isobutylene, fluorine-containing olefins such as tetrafluoroethylene or hexafluoropropylene, fluorine-containing cyclic monomers such as perfluoro(2,2-dimethyl-1,3-dioxol or the like, cyclopolymerizable perfluorodienes such as perfluoro (butenyl vinyl ether) or the like, acrylic esters such as methyl acrylate or ethyl methacrylate, vinyl esters such as vinyl acetate, vinyl benzoate or vinyl adamantylate, vinyl ethers such as ethyl ether or cyclohexyl vinyl ether, cyclic olefins such as cyclohexene, norbornene or norbornadiene, maleic anhydride, vinyl chloride, or the like.

The molecular weight of fluoropolymer of the present invention is not particularly limited so long as the fluoropolymer can be uniformly dissolved in an organic solvent, and it can be uniformly coated on a substrate. However, usually, its number average molecular weight as calculated in terms of polystyrene is suitably from 1,000 to 100,000, preferably from 2,000 to 20,000. If the number average molecular weight is set to be more than 1,000, a better resist pattern is obtainable, a film remaining rate after development is sufficient, and a better dimensional stability during heat treatment of the pattern is obtainable. On the other hand, if the number average molecular weight is set to be less than 100,000, a better coating property of the composition is obtainable, and a sufficient developability can be retained.

The fluoropolymer of the present invention can be obtained by homopolymerization or copolymerization of the fluorinated diene (1) in the presence of a polymerization initiator. Otherwise, the fluoropolymer of the present invention can be obtained by blocking a hydroxyl group of a polymer (hereinafter referred to as "fluoropolymer precursor") having a hydroxyl group-containing monomer unit obtainable by homopolymerization or copolymerization of the hydroxyl group-containing fluorinated diene in the presence of a polymerization initiator, by a blocking agent represented by the formula (7).

(7)

In the above formula, T is a halogen atom, particularly preferably a chlorine atom.

A polymerization initiating source is not particularly limited so long as it makes polymerization reaction proceed radically. For example, it may be a radical-generating agent, light or ionizing radiation. Particularly preferred is a radical-generating agent, and a peroxide, an azo compound or a persulfate may, for example, be mentioned.

A polymerization method is also not particularly limited, and so-called bulk polymerization in which monomers are subjected to polymerization as they are, solution polymerization which is carried out in an organic solvent such as a fluorohydrocarbon, a chlorohydrocarbon, a fluorinated chlorohydrocarbon, an alcohol, a hydrocarbon or other organic solvents, capable of dissolving monomers, suspension polymerization which is carried out in an aqueous medium in the absence or presence of a suitable organic solvent, or emulsion polymerization which is carried out by adding an emulsifier to an aqueous medium, may, for example, be mentioned.

Polymerization temperature and pressure are not particularly limited. However, it is desirable to set appropriately by taking factors associated with a boiling point of a monomer, a heat source required, elimination of polymerization heat or the like into consideration. For example, a suitable temperature setting can be made within a temperature range of from 0° C. to 200° C., and a practically suitable temperature setting can be made within a temperature range of from room temperature to 100° C. Further, a suitable polymerization can be carried out either under reduced pressure or increased pressure, and a practically suitable polymerization can be carried out under from normal pressure to about 100 atms, further under from normal pressure to about 10 atms.

The fluoropolymer obtained in the present invention has a cyclic structure on its main chain, and it has high chemical stability or heat resistance. Further, since a hydroxyl group blocked by a specific blocking group is introduced into a side chain, it is applicable as a base polymer of resist materials for excimer laser, which has been difficult to achieve with conventional fluoropolymers. Additionally, the fluoropolymer of the present invention is applicable also to an optical fiber, an electronic member, a transparent film material, an agricultural polyvinyl chloride film, an adhesive, a fiber material, a weather-resistant coating material or the like.

EXAMPLES

Now, the present invention will be described in further detail with reference to Examples. However, it should be understood that the present invention is by no means restricted to such specific Examples. Here, THF represents tetrahydrofuran, R113 represents trichlorotrifluoroethane (organic solvent), and TFE represents tetrafluoroethylene.

Preparation Example 1

Preparation Example of chloromethyl(2-cyclohexylcyclohexyl)ether

Preparation was carried out on the basis of journals, A. Warshawsky, A. Deshe, R. Gutman, British Polymer Journal, 16 (1984) 234, and J. Polym. Sci, Polym. Chem. Ed., 23(6) (1985) 1839.

A 500 ml reactor made of glass was substituted by nitrogen, 46.6 g of 2-cyclohexylcyclohexanol and 200 ml of dehydrated chloroform were charged therein, and the resultant solution was stirred by a stirrer, and then 7.70 g of paraformaldehyde was added therein at the time of complete dissolution. Next, the reactor was cooled to 0 to 5° C. by ice bath, and hydrogen chloride was introduced into the solution by a bubbler. When a suspension of the solution caused by paraformaldehyde became clear and the solution became transparent, the introduction of hydrogen chloride was stopped. The lower phase was separately isolated, followed by drying by adding 28.3 g of anhydrous calcium chloride powder. Thereafter, 48.0 g of chloromethyl(2-cyclohexylcyclohexyl)ether was obtained (the purity according to $^1$H NMR was 87%) after distillation of the solvent.

Hereinafter, the data of $^1$H NMR is shown: $^1$H NMR (399.8 MHz, solvent: CDCl$_3$, standard: tetramethylsilane) δ (ppm): 0.84–2.23 (m, 20H), 3.54–4.20 (m, 1H (exo-, endo-form mixed)), 5.55–5.62 (m, 2H).

Preparation Example 2

Preparation Example of chloromethyl fenchyl ether 45.9 g of chloromethyl fenchyl ether was obtained in the same manner as in Preparation Example 1 except that 39.5 g of fenchyl alcohol was used instead of using 46.6 g of 2-cyclohexylcyclohexanol in Preparation Example 1. The yield was 88%, and the purity according to $^1$H NMR was 90%. Hereinafter, the data of $^1$H NMR is shown:

$^1$H NMR (399.8 MHz, solvent: CDCl$_3$, standard: tetramethylsilane) δ (ppm): 0.87–1.68 (m, 16H), 3.32 (s, 1H (exo-, endo-form mixed)), 5.48–5.50 (m, 2H).

Preparation Example 3

Preparation Example of chloromethyl(2-norbornanemethyl)ether 40.6 g of chloromethyl(2-norbornanemethyl)ether was obtained in the same manner as in Preparation Example 1 except that 32.3 g of 2-norbornanemethanol was used instead of using 46.6 g of 2-cyclohexylcyclohexanol in Preparation Example 1. The yield was 90%, and the purity according to $^1$H NMR was 90%. Hereinafter, the data of $^1$H NMR is shown:

$^1$H NMR (399.8 MHz, solvent: CDCl$_3$, standard: tetramethylsilane) δ (ppm): 0.64–2.25 (m, 11H), 3.34–3.67 (m, 2H), 5.50–5.52 (m, 2H).

Preparation Example 4

Preparation Example of chloromethyl(4-tert-butylcyclohexyl)ether 37.9 g of chloromethyl(4-tert-butylcyclohexyl)ether was obtained in the same manner as in Preparation Example 1 except that 40.0 g of 4-tert-butylcyclohexanol was used instead of using 46.6 g of 2-cyclohexylcyclohexanol in Preparation Example 1. The yield was 68%, and the purity according to $^1$H NMR was 90%. Hereinafter, the data of $^1$H NMR is shown:

$^1$H NMR (399.8 MHz, solvent: CDCl$_3$, standard: tetramethylsilane) δ (ppm): 0.85 (s, 9H), 0.98–2.11 (m, 9H), 3.60–4.02 (m, 1H(exo-, endo-form mixed)), 5.56 (s, 2H).

Preparation Example 5

Preparation Example of chloromethyl(dicyclohexylmethyl)ether 49.9 g of chloromethyl(dicyclohexylmethyl)ether was obtained in the same manner as in Preparation Example 1 except that 50.3 g of dicyclohexylmethanol was used instead of using 46.6 g of 2-cyclohexylcyclohexanol in Preparation Example 1. The yield was 79%, and the purity according to $^1$H NMR was 86%. Hereinafter, the data of $^1$H NMR is shown:

$^1$H NMR (399.8 MHz, solvent: CDCl$_3$, standard: tetramethylsilane) δ (ppm): 1.40–14.4 (m, 20H), 1.45–2.06 (m, 2H), 2.81 (d, 1H), 5.46 (s, 2H).

Preparation Example 6

Preparation Example of 1,1,2,3,3-pentafluoro-4-trifluoromethyl-4-hydroxy-1,6-heptadiene)

Into a 2 L reactor made of glass, 108 g of CF$_2$ClCFClCF$_2$C(O)CF$_3$ and 500 ml of dehydrated THF were charged and cooled to 0° C. A diluted solution having 200 ml of a 2M THF solution of CH$_2$=CHCH$_2$MgCl further diluted with 200 ml of dehydrated THF, was dropwise added thereto in a nitrogen atmosphere over a period of about 5.5 hours. After completion of the dropwise addition, the mixture was stirred at 0° C. for 30 minutes and at room temperature for 17 hours, whereupon 200 ml of 2N hydrochloric acid was dropwise added. 200 ml of water and 300 ml of diethyl ether were added for liquid separation, and a diethyl ether layer was obtained as an organic layer. The organic layer was dried over magnesium sulfate, followed by filtration to obtain a crude liquid. The crude liquid was concentrated by an evaporator, followed by distillation under reduced pressure to obtain 85 g of CF$_2$ClCFClCF$_2$C(CF$_3$)(OH)CH$_2$CH=CH$_2$ (60 to 66° C./0.7 kPa).

Then, into a 500 ml reactor made of glass, 81 g of zinc and 170 ml of dioxane were charged, and activation of zinc was carried out by iodine. The reactor was heated to 100° C., and a solution prepared by diluting 84 g of the above prepared CF$_2$ClCFClCF$_2$C(CF$_3$)(OH)CH$_2$CH=CH$_2$ with 50 ml of dioxane, was dropwise added thereto over a period of 1.5 hours. After completion of the dropwise addition, the mixture was stirred at 100° C. for 40 hours. The reaction solution was filtered and washed with a small amount of dioxane. The filtrate was distilled under reduced pressure to obtain 30 g of CF$_2$=CFCF$_2$C(CF$_3$)(OH)CH$_2$CH=CH$_2$ (36 to 37° C./1 kPa) Hereinafter, the data of $^1$H NMR and $^{19}$F NMR are shown.

$^1$H NMR (399.8 MHz, solvent: CDCl$_3$, standard: tetramethylsilane) δ (ppm): 2.74 (d, J=7.3, 2H) 3.54 (broad s, 1H), 5.34 (m, 2H), 5.86 (m, 1H).

$^{19}$F NMR (376.2 MHz, solvent: CDCl$_3$, standard: CFCl$_3$) δ (ppm): −75.7 (m, 3F), −92.2 (m, 1F), −106.57 (m, 1F), −112.6 (m, 2F), −183.5 (m, 1F).

Preparation Example 7

Preparation Example of 1,1,2,3,3-pentafluoro-4-trifluoromethyl-4-methoxymethoxy-1,6-heptadiene)

Into a 10 L reactor made of glass, 758 g of CF$_2$ClCFClCF$_2$C(O)CF$_3$ and 4.5 L of dehydrated THF were charged and cooled to 0° C. 1.4 L of a 2M THF solution of CH$_2$=CHCH$_2$MgCl, was dropwise added thereto in a nitrogen atmosphere over a period of about 10.5 hours. After completion of the dropwise addition, the mixture was stirred at 0° C. for 30 minutes and at room temperature for 12 hours, whereupon 350 g of chloromethyl methyl ether was dropwise added. The mixture was further stirred at room temperature for 92 hours. 1.5 L of water was added, followed by liquid separation. A crude liquid obtained by concentrating an organic layer by an evaporator, was washed twice with 1.5 L of water. Then, it was distilled under reduced pressure to obtain 677 g of $CF_2ClCFClCF_2C(CF_3)(OCH_2OCH_3)CH_2CH=CH_2$ (53 to 55° C./0.17 kPa).

Then, into a 3 L reactor made of glass, 577 g of zinc and 1.3 L of dioxane were charged, and activation of zinc was carried out by iodine. Then, the reactor was heated to 100° C., and 677 g of the above prepared $CF_2ClCFClCF_2C(CF_3)(OCH_2OCH_3)CH_2CH=CH_2$ was dropwise added thereto over a period of 2 hours. After completion of the dropwise addition, the mixture was stirred at 100° C. for 47 hours. The reaction solution was filtered and washed with a small amount of dioxane. To the filtrate, 2.5 L of water and 1.5 L of ether were added, followed by liquid separation. An organic layer was dried over anhydrous magnesium sulfate, followed by filtration to obtain a crude liquid. The crude liquid was concentrated by an evaporator, followed by distillation under reduced pressure to obtain 177 g of $CF_2=CFCF_2C(CF_3)(OCH_2OCH_3)CH_2CH=CH_2$ (43 to 45° C./0.6 kPa) Hereinafter, the data of $^1H$ NMR and $^{19}F$ NMR are shown.

$^1H$ NMR (399.8 MHz, solvent: $CDCl_3$, standard: tetramethylsilane) δ (ppm): 3.16 (broad, 2H), 3.44 (s, 3H), 4.95 (m, 2H), 5.22 (m, 2H), 5.92 (m, 1H).

$^{19}F$ NMR (376.2 MHz, solvent: $CDCl_3$, standard: $CFCl_3$) δ (ppm): −72.5 (m, 3F), −92.9 (m, 1F), −106.8 (m, 1F), −109.7 (m, 2F), −183.0 (m, 1F).

Preparation Example 8

Preparation Example of Fluoropolymer Precursor 7.50 g of 1,1,2,3,3-pentafluoro-4-trifluoromethyl-4-hydroxy-1,6-heptadiene [$CF_2=CFCF_2C(CF_3)(OH)CH_2CH=CH_2$], 3.66 g of 1,4-dioxane and 16.6 g of methyl acetate were charged into a pressure resistant reactor made of glass having an internal capacity of 30 mL. Next, 0.22 g of perfluorobenzoyl peroxide was added as a polymerization initiator. The interior of the system was freeze-deaerated, and then, polymerization was carried out for 18 hours in a constant temperature shaking vessel (70° C.). After the polymerization, the reaction solution was dropwise added into hexane to reprecipitate a polymer, followed by vacuum drying at 150° C. for 15 hours. As a result, 5.40 g of a white powdery non-crystalline polymer having a fluorinated cyclic monomer unit in its main chain (hereinafter referred to as precursor polymer A) was obtained. A molecular weight of precursor polymer A was measured by GPC (THF solvent), and as calculated in terms of a polystyrene, the number average molecular weight (Mn) was 7,600, and the weight average molecular weight (Mw) was 15,000, whereby Mw/Mn=1.99. A glass transition point measured by a differential scanning calorimetry (DSC) was 152° C.

Preparation Example 9

Preparation Example of Fluoropolymer Precursor 4.82 g of 1,1,2,3,3-pentafluoro-4-trifluoromethyl-4-hydroxy-1,6-heptadiene[$CF_2=CFCF_2C(CF_3)(OH)CH_2CH=CH_2$], 1.00 g of 1,1,2,3,3-pentafluoro-4-trifluoromethyl-4-methoxymethyloxy-1,6-heptadiene[$CF_2=CFCF_2C(CF_3)(OCH_2OCH_3)CH_2CH=CH_2$], 0.78 g of 1,4-dioxane and 15.4 g of methyl acetate were charged into a pressure resistant reactor made of glass having an internal capacity of 30 mL. Next, 0.088 g of perfluorobenzoyl peroxide was added as a polymerization initiator. The interior of the system was freeze-deareated, and then, polymerization was carried out for 18 hours in a constant temperature shaking vessel (70° C.). After the polymerization, the reaction solution was dropwise added into hexane to reprecipitate a polymer, followed by vacuum drying at 150° C. for 15 hours. As a result, 5.16 g of a white powdery non-crystalline polymer having a fluorinated cyclic monomer unit in its main chain (hereinafter referred to as precursor polymer B) was obtained. A molecular weight of precursor polymer B was measured by GPC (THF solvent), and as calculated in terms of a polystyrene, the number average molecular weight (Mn) was 12,800, and the weight average molecular weight (Mw) was 31,000, whereby Mw/Mn=2.42. A glass transition point measured by a differential scanning calorimetry (DSC) was 140° C.

The polymer composition calculated by $^{19}F$ NMR and $^1H$ NMR measurements, was a monomer unit composed of 1,1,2,3,3-pentafluoro-4-trifluoromethyl-4-hydroxy-1,6-heptadiene/a monomer unit composed of 1,1,2,3,3-pentafluoro-4-trifluoromethyl-4-methoxymethyloxy-1,6-heptadiene=85.0/15.0 mol %.

Preparation Example 10

Preparation Example of Fluoropolymer Precursor 6.43 g of 1,1,2,3,3-pentafluoro-4-trifluoromethyl-4-hydroxy-1,6-heptadiene[$CF_2=CFCF_2C(CF_3)(OH)CH_2CH=CH_2$], 0.18 g of tert-butyl methacrylate, 0.93 g of 1,4-dioxane and 20.4 g of methyl acetate were charged into a pressure resistant reactor made of glass having an internal capacity of 30 mL. Next, 0.112 g of perfluorobenzoyl peroxide was added as a polymerization initiator. The interior of the system was freeze-deaerated, and then, polymerization was carried out for 18 hours in a constant temperature shaking vessel (70° C.). After the polymerization, the reaction solution was dropwise added into hexane to reprecipitate a polymer, followed by vacuum drying at 150° C. for 15 hours. As a result, 5.28 g of a white powdery non-crystalline polymer having a fluorinated cyclic monomer unit and a monomer unit composed of tert-butyl methacrylate in the main chain (hereinafter referred to as precursor polymer C) was obtained. A molecular weight of precursor polymer C was measured by GPC (THF solvent), and as calculated in terms of a polystyrene, the number average molecular weight (Mn) was 8,300, and the weight average molecular weight (Mw) was 16,800, whereby Mw/Mn=2.01. A glass transition point measured by a differential scanning calorimetry (DSC) was 162° C.

The polymer composition calculated by $^{19}F$ NMR and $^1H$ NMR measurements, was a monomer unit composed of 1,1,2,3,3-pentafluoro-4-trifluoromethyl-4-hydroxy-1,6-heptadiene/a monomer unit composed of tert-butyl methacrylate=95/5 mol %.

Example 1

5.00 g of precursor polymer A prepared in Preparation Example 8 and 25 mL of methanol were put into a 200 mL round flask and stirred with a magnetic stirrer. After dissolving the polymer, a methanol solution of sodium hydroxide (0.31 g of sodium hydroxide is previously dissolved in 7.65 g of methanol) was added therein and stirred overnight at room temperature. After distilling the solvent, 200 mL of dehydrated THF and 1.95 g of chloromethyl(2-cyclohexylcyclohexyl)ether prepared in Preparation Example 1 were added and stirred vigorously. The above solution was stirred for three days at room temperature, and then the solvent was distilled off. A residue thus obtained was dissolved in 100 mL of diethyl ether, and 200 mL of pure water was added for liquid separation to remove a water-soluble component. After distillation of the solvent from the organic layer, the residue was dissolved in 20 mL of acetone, and it was dropwise added into hexane to reprecipitate a polymer. The polymer thus obtained was vacuum dried at 130° C. for 15 hours, and 4.20 g of a white powdery non-crystalline polymer (hereinafter referred to as Polymer 3A) was obtained.

A blocked ratio (i.e. a ratio of blocked hydroxyl groups to the total of the blocked hydroxyl groups and non-blocked hydroxyl groups (%)) calculated by $^1$H NMR measurement was 29%.

Example 2

4.20 g of a white powdery non-crystalline polymer was obtained in the same manner as in Example 1 except that 1.58 g of chloromethylphentyl ether prepared in Preparation Example 2 was used instead of using 1.95 g of chloromethyl (2-cyclohexylcyclohexyl)ether in Example 1.

A blocked ratio (i.e. a ratio of blocked hydroxyl groups to the total of the blocked hydroxyl groups and non-blocked hydroxyl groups (%)) calculated by $^1$H NMR measurement was 32%.

Example 3

4.30 g of a white powdery non-crystalline polymer was obtained in the same manner as in Example 1 except that 2.17 g of chloromethyl(2-norbornanemethyl)ether prepared in Preparation Example 3 was used instead of using 1.95 g of chloromethyl(2-cyclohexylcyclohexyl)ether in Example 1.

A blocked ratio (i.e. a ratio of blocked hydroxyl groups to the total of the blocked hydroxyl groups and non-blocked hydroxyl groups (%)) calculated by $^1$H NMR measurement was 33%.

Example 4

4.00 g of a white powdery non-crystalline polymer was obtained in the same manner as in Example 1 except that 1.69 g of chloromethyl(4-tert-butylcyclohexyl)ether prepared in Preparation Example 4 was used instead of using 1.95 g of chloromethyl(2-cyclohexylcyclohexyl)ether in Example 1.

A blocked ratio (i.e. a ratio of blocked hydroxyl groups to the total of the blocked hydroxyl groups and non-blocked hydroxyl groups (%)) calculated by $^1$H NMR measurement was 32%.

Example 5

4.10 g of a white powdery non-crystalline polymer was obtained in the same manner as in Example 1 except that 1.60 g of chloromenthyl ether was used instead of using 1.95 g of chloromethyl(2-cyclohexylcyclohexyl)ether in Example 1.

A protection ratio (i.e. a ratio of blocked hydroxyl groups to the total of the blocked hydroxyl groups and non-blocked hydroxyl groups (%)) calculated by $^1$H NMR measurement was 34%.

Example 6

4.40 g of a white powdery non-crystalline polymer was obtained in the same manner as in Example 1 except that 1.91 g of chloromethyl(dicyclohexylmethyl)ether prepared in Preparation Example 5 was used instead of using 1.95 g of chloromethyl(2-cyclohexylcyclohexyl)ether in Example 1.

A protection ratio (i.e. a ratio of blocked hydroxyl groups to the total of the blocked hydroxyl groups and non-blocked hydroxyl groups (%)) calculated by $^1$H NMR measurement was 27%.

Example 7

4.30 g of a white powdery non-crystalline polymer was obtained in the same manner as in Example 1 except that in Example 1, polymer precursor B prepared in Preparation Example 9 was used instead of using polymer precursor A prepared in Preparation Example 8; the amount of sodium hydroxide solution was changed so as to have 0.16 g of sodium hydroxide dissolved in 3.83 g of methanol; and the amount of chloromethyl(2-cyclohexylcyclohexyl)ether was changed to 0.98 g.

A protection ratio (i.e. a ratio of blocked hydroxyl groups to the total of the blocked hydroxyl groups and non-blocked hydroxyl groups (%)) calculated by $^1$H NMR measurement was 29% (breakdown: 14% (protected group of Preparation Example 1), 15% (methoxymethyl group)).

Example 8

4.00 g of a white powdery non-crystalline polymer was obtained in the same manner as in Example 1 except that in Example 1, polymer precursor C prepared in Preparation Example 10 was used instead of using polymer precursor A prepared in Preparation Example 8; and the amount of sodium hydroxide in Example 1 was changed so as to have 0.21 g of sodium hydroxide dissolved in 5.10 g of methanol.

A protection ratio (i.e. a ratio of blocked hydroxyl groups to the total of the blocked hydroxyl groups and non-blocked groups (a ratio of blocked acidic groups to the total acidic groups (%))) was 25% (breakdown: 20% (protected group of Preparation Example 1), 5% (tert-butyl group of tert-butyl methacrylate)).

INDUSTRIAL APPLICABILITY

According to the present invention, a fluoropolymer having a specific blocking group is obtainable. The fluoropolymer has a ring structure in its main chain, and it is suitable for use as a base polymer for resist materials for lithography employing excimer lasers having a wavelength of 250 nm or shorter, since it has high chemical stability, heat resistance or transparency to excimer lasers having a wavelength of 250 nm or shorter. Further, the fluoropolymer is applicable also to an optical fiber, an electronic member, a transparent film material, an agricultural polyvinyl chloride film, an adhesive, a fiber material, a weather-resistant coating material or the like.

The entire disclosure of Japanese Patent Application No. 2002-323826 filed on Nov. 7, 2002 including specification, claims and summary is incorporated herein by reference in its entirety.

What is claimed is:

1. A fluoropolymer comprising a monomer unit formed cyclopolymerization of a fluorinated diene represented by the formula (1):

$$CF_2=CR^1-R^3-C(R^4)(R^5)-R^6-CR^2=CH_2 \qquad (1)$$

wherein each of $R^1$ and $R^2$ which are independent from each other, is a hydrogen atom, a fluorine atom, an alkyl group having a carbon number of at most 3, or a fluoroalkyl group having a carbon number of at most 3; each of $R^3$ and $R^6$ which are independent from each other, is a single bond, an oxygen atom, an alkylene group having a carbon number of at most 3, which may have an etheric oxygen atom, or a fluoroalkylene group having a carbon number of at most 3, which may have an etheric oxygen atom; $R^4$ is a hydrogen atom, a fluorine atom, an alkyl group having a carbon number of at most 3, or a fluoroalkyl group having a carbon number of at most 3, which may have an etheric oxygen atom; and $R^5$ is a hydroxyl group blocked by a blocking group represented by the formula (2) or an organic group having a hydroxyl group blocked by the blocking group represented by the formula (2):

$$-CHR^7-O-R^8 \qquad (2)$$

$R^7$ is a hydrogen atom or an alkyl group having a carbon number of at most 3, and $R^8$ is a cycloalkyl group which may have a substituent, an organic group having at least one of said cycloalkyl group, a bicycloalkyl group which may have a substituent, or an organic group having at least one of said bicycloalkyl group).

2. A fluoropolymer comprising a monomer unit formed cyclopolymerization of a fluorinated diene represented by the formula (3):

$$CF_2=CFCF_2-C(CF_3)(R^5)-CH_2CH=CH_2 \qquad (3)$$

wherein $R^5$ is a hydroxyl group blocked by a blocking group represented by the formula (2), or an organic group having a hydroxyl group blocked by the blocking group represented by the formula (2):

$$-CHR^7-O-R^8 \qquad (2)$$

wherein $R^7$ is a hydrogen atom or an alkyl group having a carbon number of at most 3, and $R^8$ is a cycloalkyl group which may have a substituent, an organic group having at least one of said cycloalkyl group, or a bicycloalkyl group which may have a substituent).

3. The fluoropolymer according to claim 1, wherein the above-mentioned $R^8$ is a group represented by the formula (4), (5) or (6),

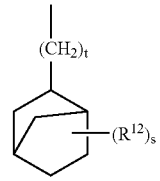
(4)

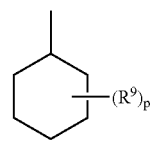
(5)

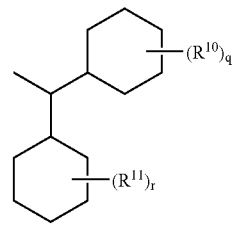
(6)

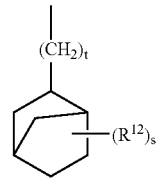

wherein each of $R^9$, $R^{10}$, $R^{11}$ and $R^{12}$ which are independent from each other, is a fluorine atom, an alkyl group having a carbon number of at most 3, a tert-butyl group, a cyclohexyl group, a cyclopentyl group, or a fluoroalkyl group having a carbon number of at most 3; each of p, q, r and s which are independent from each other, is an integer of from 0 to 11, and t is 0 or 1; when p is at least 2, each $R^9$ may be different; when q is at least 2, each $R^{10}$ may be different; when r is at least 2, each $R^{11}$ may be different; and when s is at least 2, each $R^{12}$ may be different).

4. The fluoropolymer according to claim 2, wherein the above-mentioned $R^8$ is a group represented by the formula (4), (5) or (6), (4)

(5)

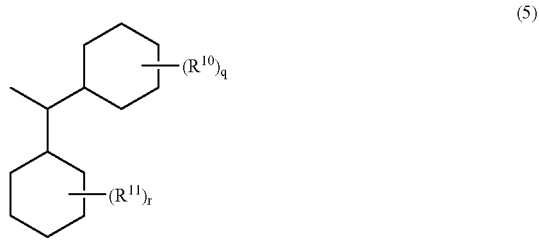

(6)

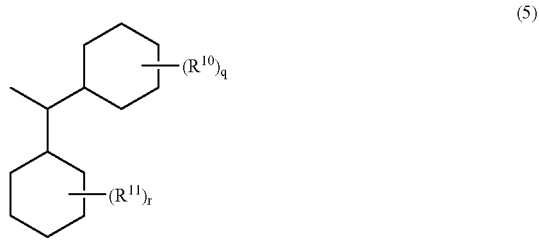

(wherein each of $R^9$, $R^{10}$, $R^{11}$ and $R^{12}$ which are independent from each other, is a fluorine atom, an alkyl group having a carbon number of at most 3, a tert-butyl group, a cyclohexyl group, a cyclopentyl group, or a fluoroalkyl group having a carbon number of at most 3; each of p, q, r and s which are independent from each other, is an integer of from 0 to 11, and t is 0 or 1; when p is at least 2, each $R^9$ may be different; when q is at least 2, each $R^{10}$ may be different; when r is at least 2, each $R^{11}$ may be different; and when s is at least 2, each $R^{12}$ may be different).

* * * * *